US010981836B2

(12) United States Patent
Chandrashekhar et al.

(10) Patent No.: US 10,981,836 B2
(45) Date of Patent: Apr. 20, 2021

(54) LASER INDUCED GRAPHITIZATION OF BORON CARBIDE IN AIR

(71) Applicants: UNIVERSITY OF SOUTH CAROLINA, Columbia, SC (US); MORGAN STATE UNIVERSITY, Baltimore, MD (US)

(72) Inventors: Mvs Chandrashekhar, Columbia, SC (US); Joshua Letton, Columbia, SC (US); Travis Williams, West Columbia, SC (US); Abdulganiyu Ajilore, Randallstown, MD (US); Michael Spencer, Baltimore, MD (US)

(73) Assignees: University of South Carolina, Columbia, SC (US); Morgan State University, Baltimore, MD (US)

( * ) Notice: Subject to any disclaimer, the term of this patent is extended or adjusted under 35 U.S.C. 154(b) by 0 days.

(21) Appl. No.: 16/402,537

(22) Filed: May 3, 2019

(65) Prior Publication Data

US 2019/0352234 A1 Nov. 21, 2019

Related U.S. Application Data

(60) Provisional application No. 62/811,601, filed on Feb. 28, 2019, provisional application No. 62/671,592, filed on May 15, 2018.

(51) Int. Cl.
*C04B 35/563* (2006.01)
*C04B 35/628* (2006.01)
(Continued)

(52) U.S. Cl.
CPC ...... *C04B 35/563* (2013.01); *C04B 35/62884* (2013.01); *C04B 41/009* (2013.01);
(Continued)

(58) Field of Classification Search
CPC ............ C04B 35/563; C04B 35/62884; C04B 41/0036; C04B 41/009; C04B 41/85
See application file for complete search history.

(56) References Cited

U.S. PATENT DOCUMENTS 5,840,132 A * 11/1998 Erdemir .................... C23C 8/80
148/280
8,617,669 B1 * 12/2013 Quick ............... H01L 21/02381
427/248.1
(Continued)

FOREIGN PATENT DOCUMENTS

CN 103940804 7/2014
CN 105016733 11/2015

OTHER PUBLICATIONS

Aselage, et al. "Lattice constants of boron carbides" *J Am Ceramic Soc* 75(8) (1992) pp. 2207-2212. (Abstract only).
(Continued)

*Primary Examiner* — Michael P Wieczorek
(74) *Attorney, Agent, or Firm* — Dority & Manning, P.A.

(57) ABSTRACT

The localized formation of graphene and diamond like structures on the surface of boron carbide is obtained due to exposure to high intensity laser illumination. The graphitization involves water vapor interacting with the laser illuminated surface of boron carbide and leaving behind excess carbon. The process can be done on the micrometer scale, allowing for a wide range of electronic applications. Raman is a powerful and convenient technique to routinely characterize and distinguish the composition of Boron Carbide ($B_4C$), particularly since a wide variation in C content is possible in $B_4C$. Graphitization of 1-3 μm icosahedral $B_4C$ powder is observed at ambient conditions under illumination by a 473 nm (2.62 eV) laser during micro-Raman measurements. The graphitization, with ~12 nm grain size, is dependent on the illumination intensity. The process is attributed
(Continued)

to the oxidation of $B_4C$ to $B_2O_3$ by water vapor in air, and subsequent evaporation, leaving behind excess carbon. The effectiveness of this process sheds light on amorphization pathways of $B_4C$, a critical component of resilient mechanical composites, and also enables a means to thermally produce graphitic contacts on single crystal $B_4C$ for nanoelectronics.

27 Claims, 10 Drawing Sheets

(51) Int. Cl.
    *C04B 41/85*     (2006.01)
    *C04B 41/00*     (2006.01)
(52) U.S. Cl.
    CPC .......... *C04B 41/0036* (2013.01); *C04B 41/85* (2013.01); *C04B 2235/3821* (2013.01); *C04B 2235/425* (2013.01); *C04B 2235/427* (2013.01); *C04B 2235/549* (2013.01)

(56) References Cited

U.S. PATENT DOCUMENTS 9,966,491 B2    5/2018   Chandrashekhar et al.
2016/0315211 A1  10/2016  Chandrashekhar et al.

OTHER PUBLICATIONS

Balakrishnarajan, et al. "Structure and bonding in boron carbide: The invincibility of imperfections" *New J Chem* 31(4) (2007) pp. 473-485.
Caruso, et al. "The all boron carbide diode neutron detector: Comparison with theory" *Mat Sci Eng: B* 135(2) (2006) pp. 129-133.
Chava, et al. "High detectivity visible-blind SiF4 grown epitaxial graphene/SiC Schottky contact bipolar phototransistor" *Applied Physics Letters* 111(24):243504 (2017).
Cong, et al. "Second-order overtone and combination Raman modes of graphene layers in the range of 1690-2150 cm$^{-1}$" *ACS Nano* 5(3) (2011) pp. 1600-1605.
Daas, et al. "Comparison of epitaxial graphene growth on polar and nonpolar 6H—SiC faces: On the growth of multilayer films" *Crystal Growth & Design* 12(7) (2012) pp. 3379-3387.
Domnich, et al. "Boron carbide: Structure, properties, and stability under stress" *J Am Ceramic Soc* 94(11) (2011) pp. 3605-3628.
Dvorak, et al. "Friction behavior of boric acid and annealed boron carbide coatings studied by in situ Raman tribometry" *Tribology Transactions* 45(3) (2002) pp. 354-362.
Emin, D. "Unusual properties of icosahedral boron-rich solids" *J Sol State Chem* 179(9) (2006) pp. 2791-2798.
Emin, et al. "A proposed boron-carbide-based solid-state neutron detector" *J Applied Phys* 97(1):013529 (2005).
Erdemir, et al. "Tribology of naturally occurring boric acid films on boron carbide" *Surf Coatings Techn* 86 (1996) pp. 507-510.
Everall, et al. "The effect of laser-induced heating upon the vibrational Raman spectra of graphites and carbon fibres" *Carbon* 29(2) (1991) pp. 133-137. (Abstract only).
Ferrari, et al. "Interpretation of Raman spectra of disordered and amorphous carbon" *Phys Rev B* 61(20) (2000) pp. 14095-14107.
Ghosh, et al. "Influence of stress state and strain rate on structural amorphization in boron carbide" *J Appl Phys* 111(6):063523 (2012) pp. 1-9.
Kagi, et al. "Proper understanding of down-shifted Raman spectra of natural graphite: Direct estimation of laser-induced rise in sample temperature" *Geochimica et Cosmochimica Acta* 58(16) (1994) pp. 3527-3530.
Kunka, et al. "Evaluating boron-carbide constituents with simulated Raman spectra" *Scripta Materialia* 138 (2017) pp. 32-34.
Li, et al. "Oxidation behaviour of boron carbide powder" *Mat Sci Eng: A* 444(1-2) (2007) pp. 184-191.
Litz, et al. "Oxidation of Boron Carbide by Air, Water, and Air-Water Mixtures at Elevated Temperatures" *J Electrochem Soc* 110(8) (1963) pp. 921-925.
Lunca-Popa, et al. "Evidence for multiple polytypes of semiconducting boron carbide ($C_2B_{10}$) from electronic structure" *J Phys D: Appl Phys* 38(8) (2005) pp. 1248-1252.
Pimenta, et al. "Studying disorder in graphite-based systems by Raman spectroscopy" *Phy Chem Chem Phys* 9(11) (2007) pp. 1276-1290.
Rao, et al. "Effects of layer stacking on the combination Raman modes in graphene" *ACS Nano* 5(3) (2011) pp. 1594-1599.
Sakai, et al. "Effect of oxygen partial pressure on oxidation of iron at 573 K" *J Nuclear Sci Tech* 21(11) (1984) pp. 844-852.
Schmechel, et al. "Photoluminescence of boron carbide" *J Solid State Chem* 177(2) (2004) pp. 566-568.
Tallant, et al. "Boron carbide structure by Raman spectroscopy" *Phys Rev B* 40(8) (1989) p. 5649.
Tan, et al. "Raman scattering of non-planar graphite: Arched edges, polyhedral crystals, whiskers and cones" *Phil Trans R Soc Lond A: Math, Phys Eng Sci* 362(1824) (2004) pp. 2289-2310.
Vargas-Gonzalez, et al. "Flexural strength, fracture toughness, and hardness of silicon carbide and boron carbide armor ceramics" *Intl J Appl Ceramic Tech* 7(5) (2010) pp. 643-651.
Xie, et al. "Breaking the icosahedra in boron carbide" *Proc Natl Acad Sci* 113(43) (2016) pp. 12012-12016.
Yan, et al. "Raman spectroscopy of pressure-induced amorphous boron carbide" *Applied Physics Letters* 88(13):131905 (2006) pp. 1-3.

\* cited by examiner

LASER INDUCED GRAPHITIZATION OF BORON CARBIDE IN AIR

PRIORITY CLAIMS

This application claims the benefit of previously filed U.S. Provisional Patent Applications both entitled "LASER INDUCED GRAPHITIZATION OF BORON CARBIDE IN AIR," one assigned U.S. Ser. No. 62/671,592, filed May 15, 2018, and the other assigned U.S. Ser. No. 62/811,601, filed Feb. 28, 2019, both of which are fully incorporated herein by reference for all purposes.

STATEMENT REGARDING FEDERALLY SPONSORED RESEARCH OR DEVELOPMENT

This presently disclosed subject matter was made with government support under Grant No. W911NF-12-2-0022, awarded by the Army Research Laboratory; under Grant No. ECCS-1711322, awarded by the National Science Foundation; under Grant No. DMR-1539918, awarded by the National Science Foundation; and under Grant No. 1250052, awarded by the National Science Foundation. The government has certain rights in the presently disclosed matter.

BACKGROUND OF THE PRESENTLY DISCLOSED SUBJECT MATTER

Icosahedral boron compounds are a unique, under investigated class of solids. These solids are characterized by boron's unique 6-fold electron deficient coordination [1], despite boron only having 5 total electrons. This leads to a hierarchical structure [2] composed of 12-sided prisms called icosahedra, connected by "normally" spa bonded chains. Therefore, in the neighborhood of the boron atom, there exists very strong electron localization. Even if the boron atom is knocked out its site, the electron remains behind, creating a cation/negatively charged site pair. This provides a strong driving force for the recombination of the vacancy with the cation, giving icosahedral structures self-healing properties. More recently, it has also been shown that the $sp^3$-chains in these icosahedral structures are also remarkably stable [2], more so than the icosahedra.

This self-healing characteristic has been exploited for applications where radiation damage is possible, such as betavoltaics [1] with icosahedral boron arsenide, or in neutron detectors using boron carbide [3,4]. Under extreme mechanical stress [5,6], icosahedral boron carbide, a very light icosahedral boron compound, displays a remarkable resistance to amorphization and self-healing due to this bonding structure, making it an ideal material for resilient mechanical composites e.g. armor materials [7].

Icosahedral boron carbide, nominally $B_4C$, is an extremely hard, refractory (melting point >2000° C. [5]) material. It is also polytypic [5,8], displaying a rich array of electronic properties with structure and composition [9]. The phase diagram and prior work on $B_4C$ indicates that the carbon concentration of the material can easily vary from ~6-25 at. % C [5,10]. This leads to disorder from inevitable small variations in the carbon content throughout the crystal. As described by Balakrishnarajan et al. [9], "the localization of electronic states arising from the disorder leads to the semiconducting nature of boron carbide throughout its composition range."

Presently, the incredible properties and advantages of graphene are fairly well known. Graphene's value in current and future technologies is something that has been observed in lab settings and carried over to some commercial applications already. However, larger scale and systematic creation and incorporation of graphene are currently slowed by ease of implementation into current processes, specifically electronic device fabrication. Current creation of graphene often involves complex chemical processing or mechanical exfoliation, which compromises the quality of the graphene to be used in electronic devices.

SUMMARY OF THE PRESENTLY DISCLOSED SUBJECT MATTER

In general, it is a present object to provide improved nanotechnology and associated methodologies. Further, it is a present object to provide improved Boron Carbide device fabrication and/or graphene device contacts, and associated methodology. It is a more particular object, in some instances, to provide improved graphitization of $B_4C$ from localized heating. In some instances, improved methodologies may be used for laser induced graphitization, laser induced oxidation of $B_4C$, diamond coating, and/or graphene coating.

Considering these issues and the current options, laser induced graphitization of $B_4C$ has the potential to simplify the way in which graphene and graphitic contacts are formed for electronic devices.

Presently disclosed subject matter may in some instances relate to improved processes involving the amorphization of $B_4C$, processes involving the creation of graphitic contacts, the processing of $B_4C$ composites such as sintering, consolidation etc., and/or graphene or diamond coating.

Presently disclosed subject matter may in some other instances relate to improved technology regarding laser writing of graphitic contacts. Relative simplicity of laser induced graphitization advantageously could allow for quicker adoption of the presently disclosed technology.

Raman spectroscopy is a powerful and convenient technique to routinely characterize and distinguish the composition of Boron Carbide ($B_4C$), particularly since a wide variation in C content is possible in $B_4C$. Graphitization of 1-3 μm icosahedral $B_4C$ powder is per presently disclosed subject matter observed at ambient conditions under illumination by a 473 nm (2.62 eV) laser during micro-Raman measurements. The graphitization, with ~12 nm grain size, is dependent on the illumination intensity. The presently disclosed process is attributed to the oxidation of $B_4C$ to $B_2O_3$ by water vapor in air, and subsequent evaporation, leaving behind excess carbon. The effectiveness of this process sheds light on amorphization pathways of $B_4C$, a critical component of resilient mechanical composites, and also enables a means to thermally produce graphitic contacts on single crystal $B_4C$ for nanoelectronics.

Raman measurements have arisen as a powerful and convenient technique [5,8,10] to routinely characterize and distinguish the composition and defect structure of $B_4C$. They are particularly important since such a wide variation in C content is possible. The presence of $sp^2$ bonded graphite in the Raman measurements is used as a signature for the amorphization of $B_4C$, which occurs when the material mechanically fails [5,6], where transmission electron microscopy has shown the presence of nm-sized amorphization bands, in broad agreement with Raman graphitic grain size. In this present disclosure, it is demonstrated that for micron-size $B_4C$ particles, graphitization can occur during micro-Raman (μ-Raman) measurements, creating an ambiguity in the interpretation of the amorphization mechanisms of $B_4C$ [5,6].

The localized formation of graphene and diamond like structures on the surface of boron carbide is obtained per presently disclosed subject matter due to exposure to high intensity laser illumination. The graphitization involves water vapor interacting with the laser illuminated surface of boron carbide and leaving behind excess carbon. The process can be done on the micrometer scale, allowing for a wide range of electronic applications.

It is to be understood that the presently disclosed subject matter equally relates to associated and/or corresponding resulting apparatus and/or devices for use of presently disclosed methodologies. One exemplary such method of presently disclosed technology relates in pertinent part to a method of producing graphene, comprising providing Boron Carbide ($B_4C$) powder; and exposing the powder to high intensity laser illumination in the presence of air. Per such methodology, localized formation of graphene on the surface of Boron Carbide is obtained.

Another exemplary such method of presently disclosed technology relates in pertinent part to a method for the graphitization of Boron Carbide powder, comprising the steps of providing a specimen of Boron Carbide ($B_4C$) powder and performing Raman measurements on the specimen with a laser in a controlled environment.

Yet another exemplary such method of presently disclosed subject matter relates in pertinent part to graphitization of Boron Carbide powder achieved per presently disclosed subject matter via performing Raman measurements on the sample with a 473 nm blue laser. Graphitization has successfully been done at varying temperatures and laser intensities per presently disclosed subject matter in both air and Ultra High Purity (UHP) Argon environments. At higher temperatures the formation of a diamond coating on Boron Carbide has been observed and measured per presently disclosed subject matter.

In further exemplary embodiments of presently disclosed subject matter, graphitization of 1-3 µm icosahedral $B_4C$ powder is achieved under illumination by a 473 nm (2.62 eV) laser. The graphitization is dependent on the illumination intensity and due to sample heating. The process is attributed to the oxidation of $B_4C$ to $B_2O_3$ by water vapor in air and subsequent evaporation aided by $B_2O_3$ further combining with water vapor, leaving behind excess carbon. At higher temperatures the formation of diamond like structures emerges beyond the graphene formation. The effectiveness of this presently disclosed process sheds light on amorphization pathways of $B_4C$, a critical component of resilient mechanical composites, and also enables a means to laser-write graphitic contacts on single crystal $B_4C$ for nanoelectronics.

Presently disclosed technology improves the characterization of the amorphization of $B_4C$ by Raman mapping and the processing of $B_4C$ for impact-testing. Similarly, this has the potential to improve the processing of $B_4C$ composites such as sintering and consolidation. Additionally, it provides a means of writing conductive graphitic layers on semiconducting $B_4C$ single-crystal structures for electronics applications. There are also applications of presently disclosed subject matter in graphene or diamond coating.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, to one of ordinary skill in the art, is set forth more particularly including the specification, and including reference to the accompanying figures in which.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

Reference will now be made in detail to various embodiments of the presently disclosed subject matter, one or more examples of which are set forth below. Each embodiment is provided by way of explanation of the subject matter, not limitation thereof. In fact, it will be apparent to those skilled in the art that various modifications and variations may be made in the presently disclosed subject matter without departing from the scope or spirit of the subject matter. For instance, features illustrated or described as part of one embodiment, may be used in another embodiment to yield a still further embodiment, and corresponding and/or associated methodologies may be practiced relative to apparatus disclosed and/or suggested herewith, all of which comprise various embodiments of the presently disclosed subject matter.

In general, commercial 99.9% pure $B_4C$ powder nominally 1-3 µm in size, produced by plasma chemical vapor deposition, was used in the measurements. According to the manufacturer, the free B content of the material is <4 wt %, while the free C-content is <3 wt %, <0.001 wt % for Mg, Na, Mo, Fe, Al, N, <0.002 wt % for Ca, and <wt 0.04% for O. The density of $B_4C$ is 1.8 g/cm$^3$ with a specific surface area of 2-4 m$^2$/g. The powders were then prepared for characterization in 2 ways: i) directly placed as a pile onto the measurement setup for a "thick" sample, which is strongly optically absorbing and ii) smeared like pencil lead onto a reflective white ceramic plate (R>80%) to produce a "thin" sample, which is weakly absorbing optically.

Figure 1A:
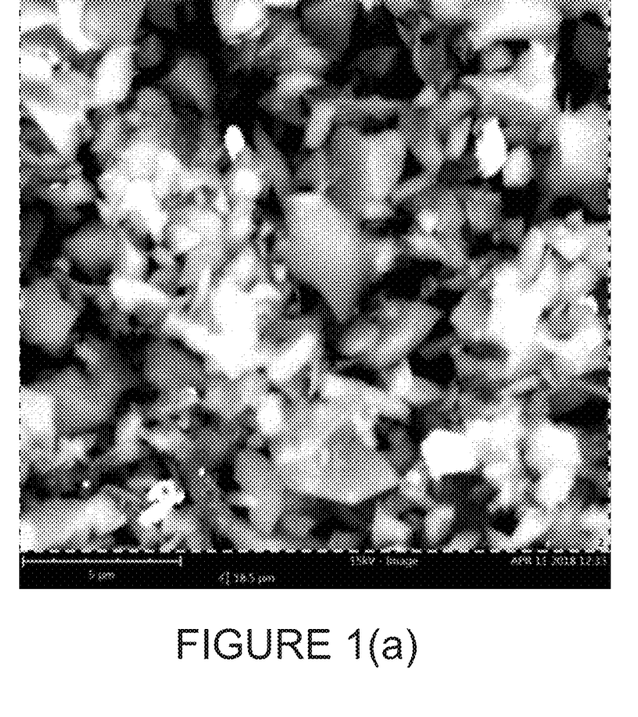
FIG. 1(a) is a scanning electron microscope (SEM) image of a sample of Boron Carbide ($B_4C$) powder, collected as a relatively "thick" pile on supporting tape, suitable for use in presently disclosed methodologies.

FIG. 1(a) is a scanning electron microscope (SEM) image per energy dispersive x-ray spectroscopy (EDX) of a sample of Boron Carbide ($B_4C$) powder, collected as a relatively "thick" pile on supporting tape, suitable for use in presently disclosed methodologies. EDX showed the carbon content to be 18-21 at. % C as expected for stoichiometric $B_4C$, while the dimensions were indeed in the specified 1-3 µm range.

X-ray diffraction (XRD) was performed on these powders, and confirms that the structure is indeed that of rhombohedral $B_4C$. A rhombohedral structure can be described by an equivalent hexagonal lattice, with lattice parameters $a_0$=5.62 Å, and $c_0$=12.15 Å, which uniquely identifies the carbon content [5, 11], at a value of approximately 16 at. % C in the $B_4C$ crystal. Given that the free carbon content is ~3 at. % C (from the manufacturer), and that the total C-content from EDX is ~18-21 at. % C, this is in good agreement with presently conducted EDX measurements.

Figure 1B:
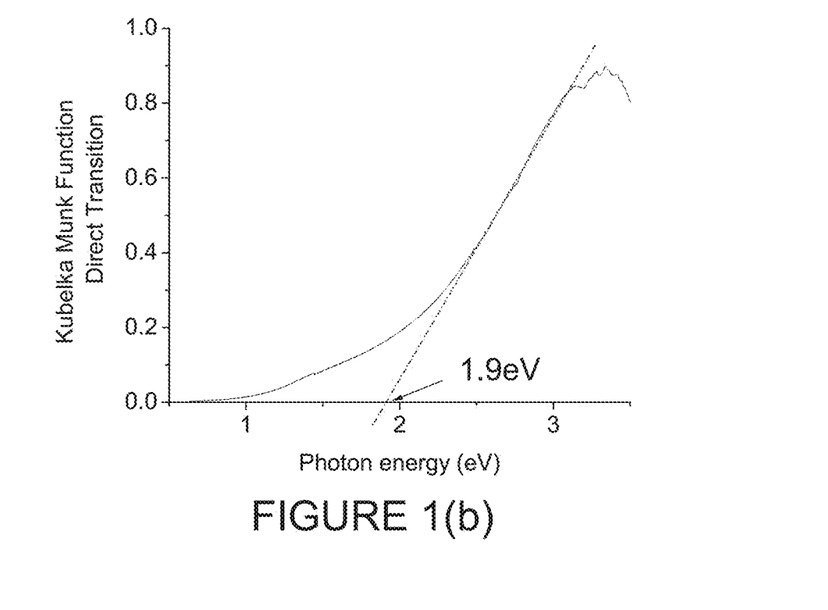
FIG. 1(b) is a graph representing an effective direct Tauc gap of 1.9 eV for the sample Boron Carbide ($B_4C$) powder of FIG. 1(a), with UV-Vis diffuse reflectance measurements indicating that such $B_4C$ powder is semiconducting.

FIG. 1(b) is a graph representing an effective direct Tauc gap of 1.9 eV for the sample Boron Carbide ($B_4C$) powder of FIG. 1(a), with UV-Vis diffuse reflectance measurements indicating that such $B_4C$ powder is semiconducting.

Figure 1C:
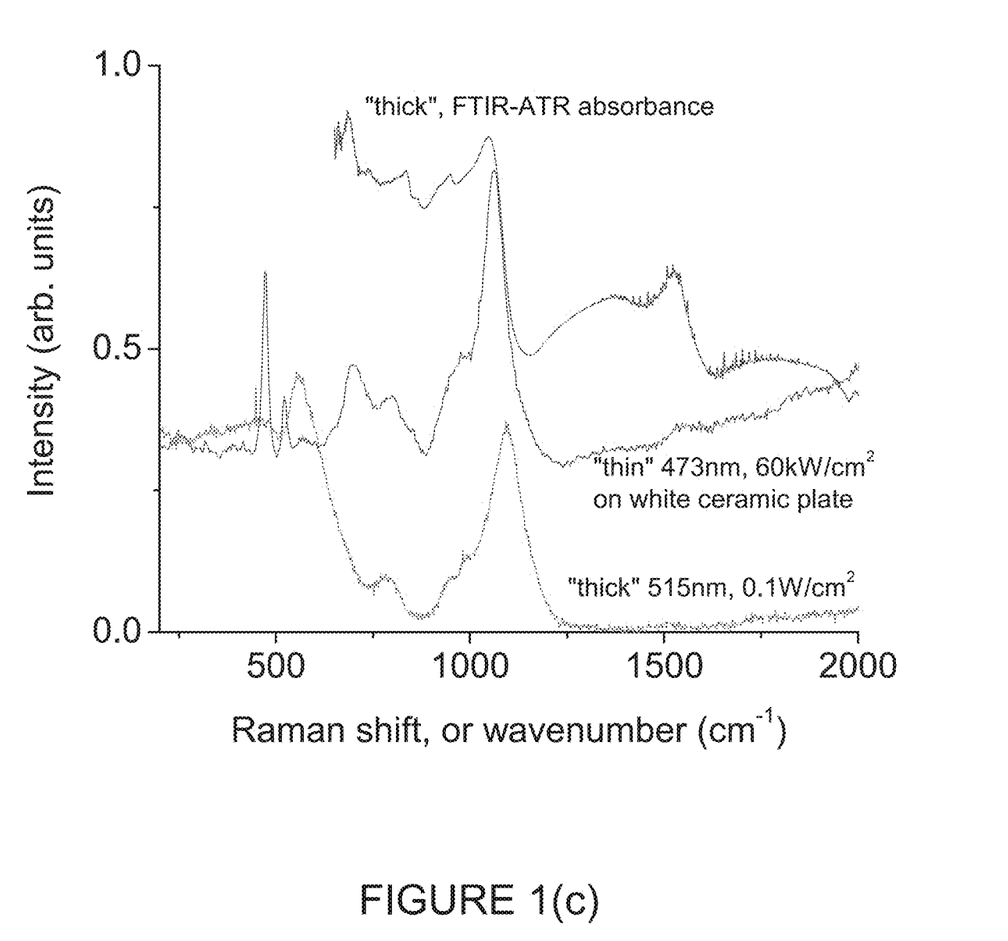
FIG. 1(c) is a graph of spectral features of large area, low-intensity Raman; high intensity µ-Raman on reflective substrate; and ATR-FTIR absorbance, respectively in overlay.

FIG. 1(c) is a graph of spectral features of large area, low-intensity Raman; high intensity µ-Raman on reflective substrate; and ATR-FTIR absorbance, respectively in overlay.

More specifically, µ-Raman measurements were performed on these powders using a 473 nm blue laser focused to a spot size of ~2 µm with a laser power varying from 0.025-25 mW on both "thick" and "thin" samples under both air and 0.1 slm flow of ultra-high purity (UHP) argon ($O_2$, $H_2O$ content ~1 ppm) ambient. All laser intensities are estimated from laser power at the sample and spot size, and are given to 1 significant figure. Large area Raman measurements were performed using a 515 nm green laser with ~3 mm spot size with ~1 mW power on the "thick" samples in air. "Thin" samples did not give measurable signal with this large area measurement. The µ-Raman measurements on "thin" samples were measured on single particles >2 µm in dimension across the ceramic substrate, giving rise to sharp peaks. The Raman spectrum of boron carbide is characterized by sharp peaks below 600 cm$^{-1}$, associated with the sp$^3$-chains, and 2 large broad features at ~700 cm$^{-1}$ and 1050 cm$^{-1}$ associated with the icosahedra [5,6,10]. See FIG. 1(c).

The sharpness of the spa-chain features for single particles at 481 cm$^{-1}$ and 534 cm$^{-1}$, and their relatively high intensities indicate qualitatively that this is stoichiometric $B_4C$ [10]. The large area 515 nm Raman spectrum represents an average over many different orientations of $B_4C$ in the "thick" powder.

Attenuated total reflection Fourier transform infrared (ATR-FTIR) spectroscopy was performed on "thick" samples using a diamond crystal in the 650-4000 cm$^{-1}$ range. These reflectance spectra were converted to absorbance spectra without applying an ATR correction. FIG. 1(c) shows the ATR-FTIR overlaid with the "thin" µ-Raman spectrum, and the "thick" large area Raman, showing that the major icosahedral features line up for the 3 techniques. None of these techniques showed any evidence of graphitic inclusions. The major broad and sharp peaks of $B_4C$ are clearly seen below ~1200 cm$^{-1}$, and related overtones above 1500 cm$^{-1}$ with no obvious evidence of graphitic inclusions.

UV-Vis diffuse reflectance measurements indicate that the $B_4C$ powder is semiconducting, with an effective direct Tauc gap of 1.9 eV. See FIG. 1(b). The measured value of band gap is in reasonable agreement with other measurements [12,13], with a large scatter due to differing defect topologies produced using varied synthesis techniques [9]. These above characterization techniques clearly show that the starting powder is indeed crystalline, stoichiometric $B_4C$ powder of 1-3 µm dimension, as per the manufacturer specifications.

Figure 2A:
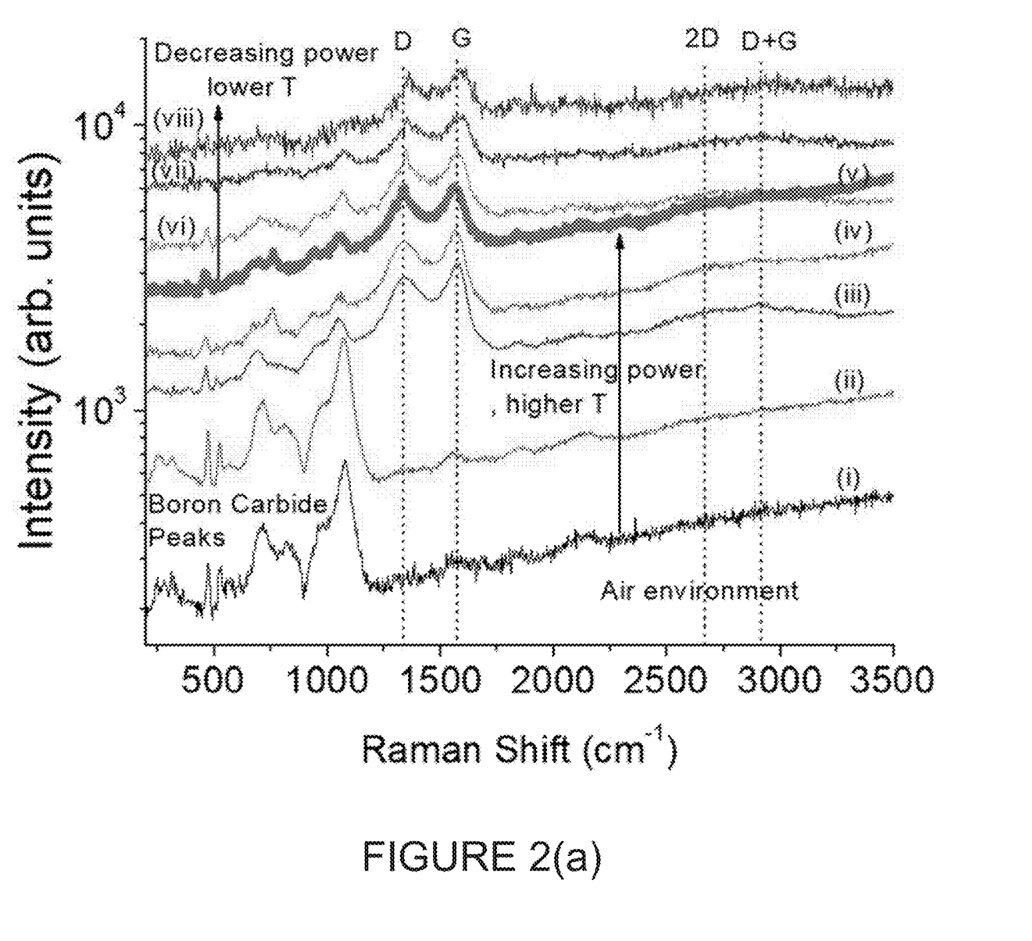
FIG. 2(a) is a graph of sequential µ-Raman spectra of a single spot with the relatively "thick" $B_4C$ powder of FIG. 1(a) in Ambient air environment at various estimated laser intensities (and with full scale of the arbitrary vertical line units of FIG. 2(a) correlating with 2400 $cm^{-1}$.

In summary when Raman measurements were performed over large areas, i.e., low laser intensity, with "thick" $B_4C$ or on a reflective, thermally conductive substrate with "thin" $B_4C$ for the µ-Raman measurements, clear signatures of crystalline $B_4C$ are observed. FIG. 2(a) is a graph of sequential µ-Raman spectra of a single spot with the relatively "thick" $B_4C$ powder of FIG. 1(a) in Ambient air environment at various estimated laser intensities, with an overwhelmingly clear signature of nano-crystalline graphite at high illumination intensities [14,15], small signature of the icosahedral $B_4C$ remains, using the same laser power as the µ-Raman measurements in FIG. 1(c) of 1 c ~60 kW/cm$^2$.

Figure 2B:
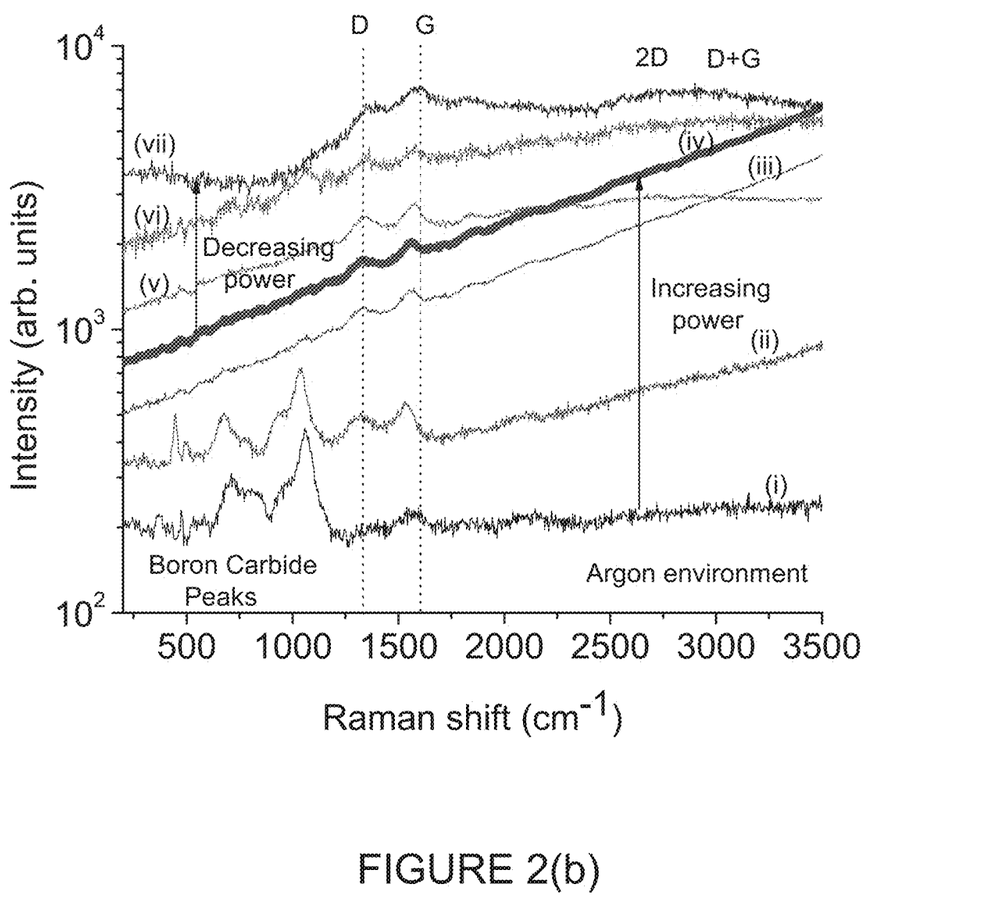
FIG. 2(b) is a graph of sequential µ-Raman spectra of another single spot with the relatively "thick" $B_4C$ powder of FIG. 1(a) under ultra-high purity Argon (1 ppm $H_2O$, $O_2$ per vendor) flow ~0.1 slm at various estimated laser intensities.
Figure 3:
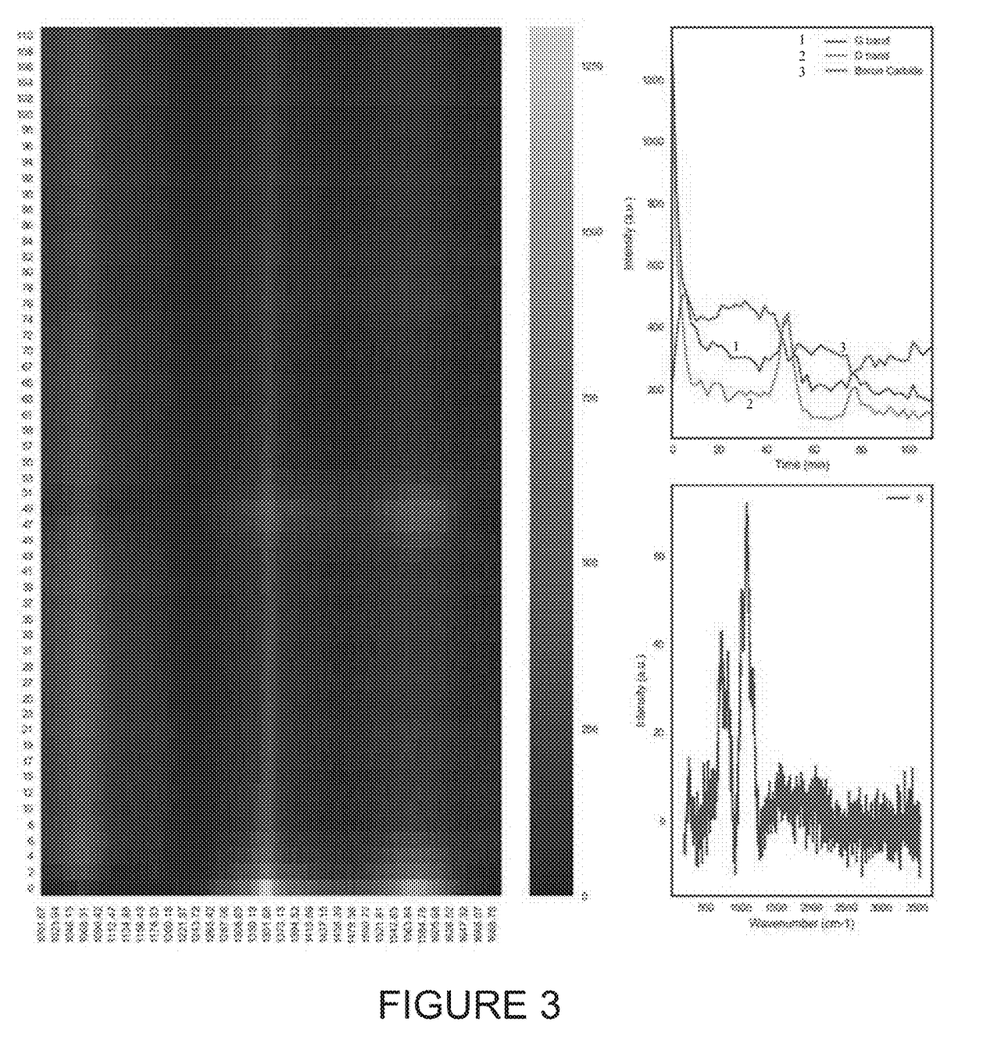
FIGS. 3 through 8 illustrate respectively various corresponding scans and graphs of wavenumber and time results relative to exposure intensities for various samples, including G band and D band information for various Boron Carbide $B_4C$ samples.
Figure 4:
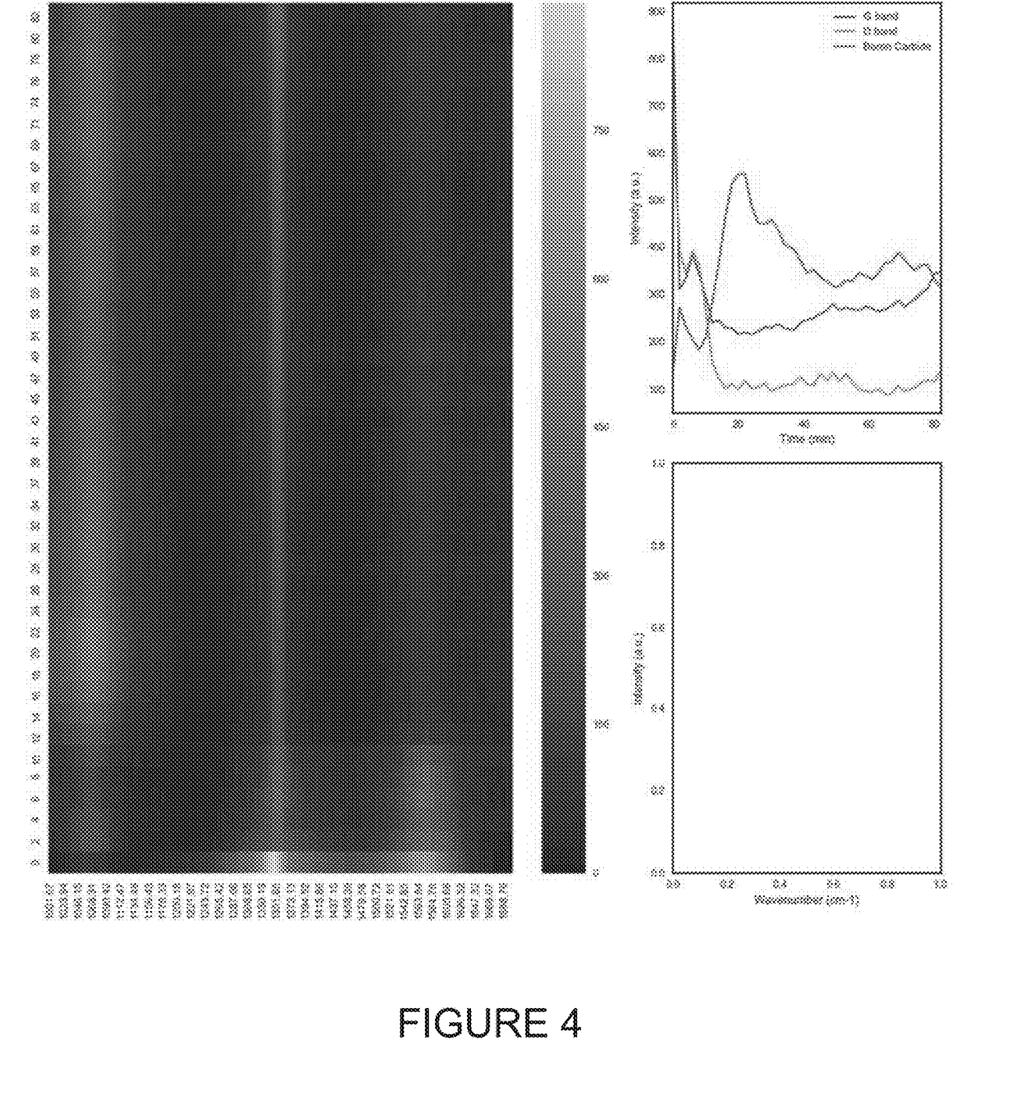
Figure 5:
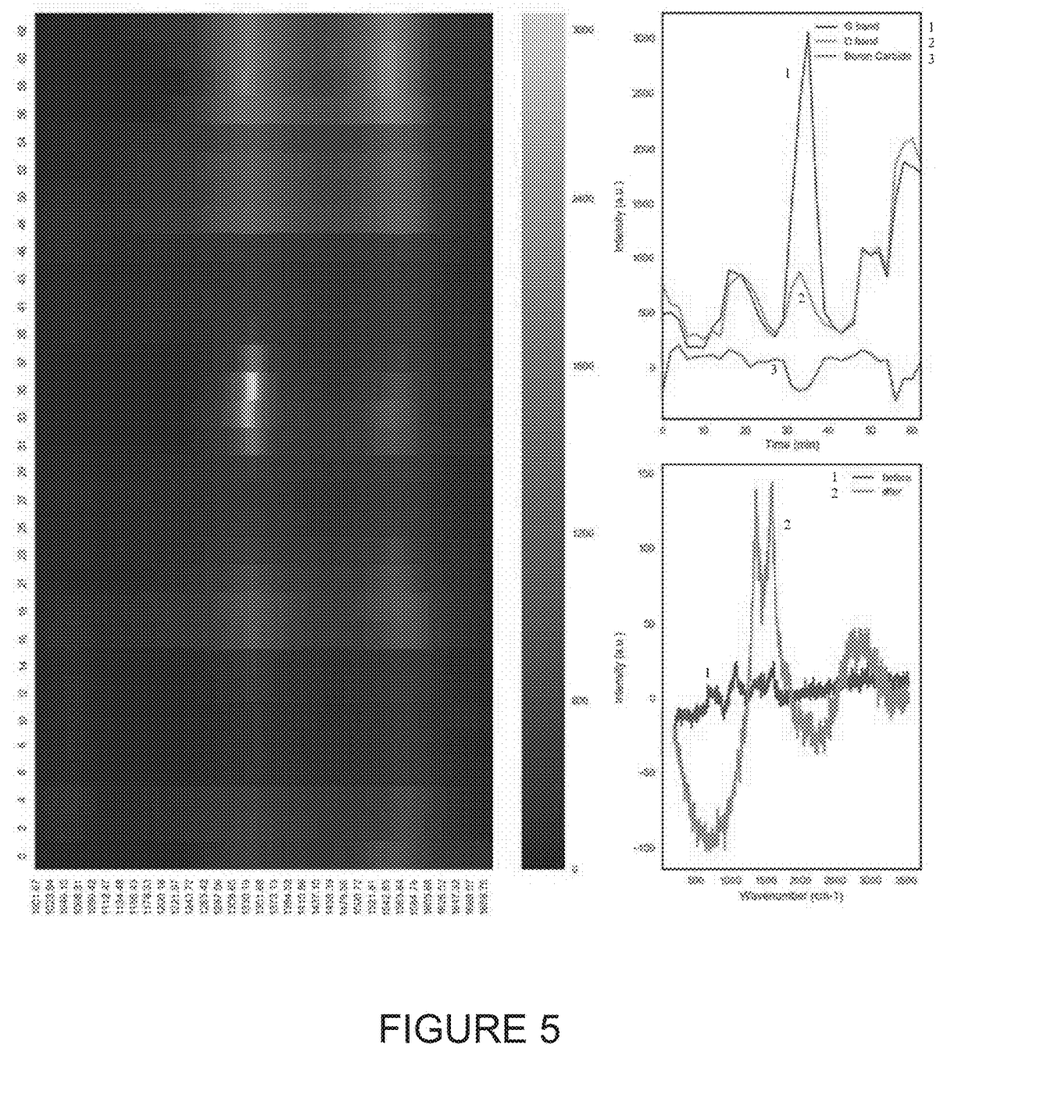
Figure 6:
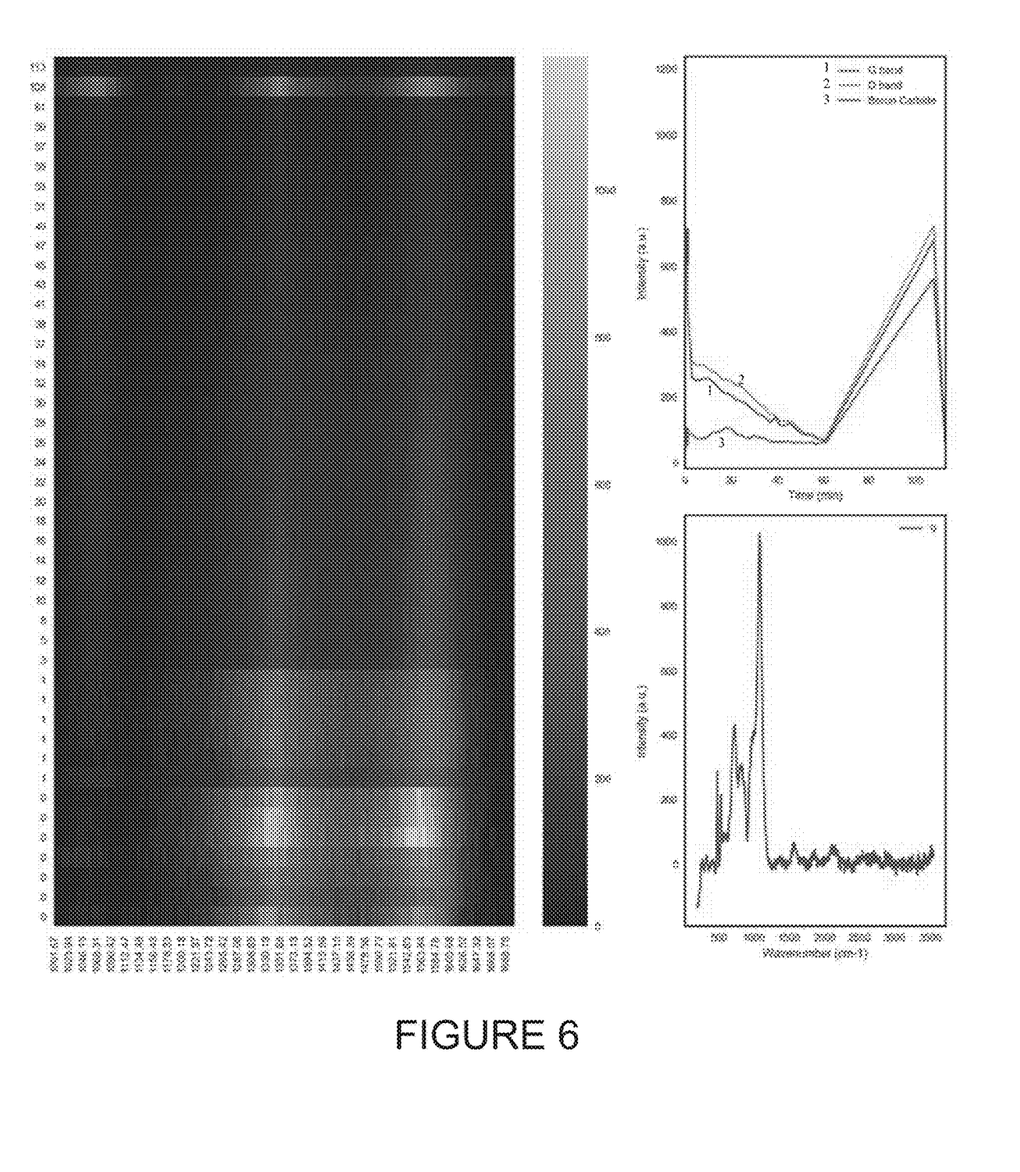
Figure 7:
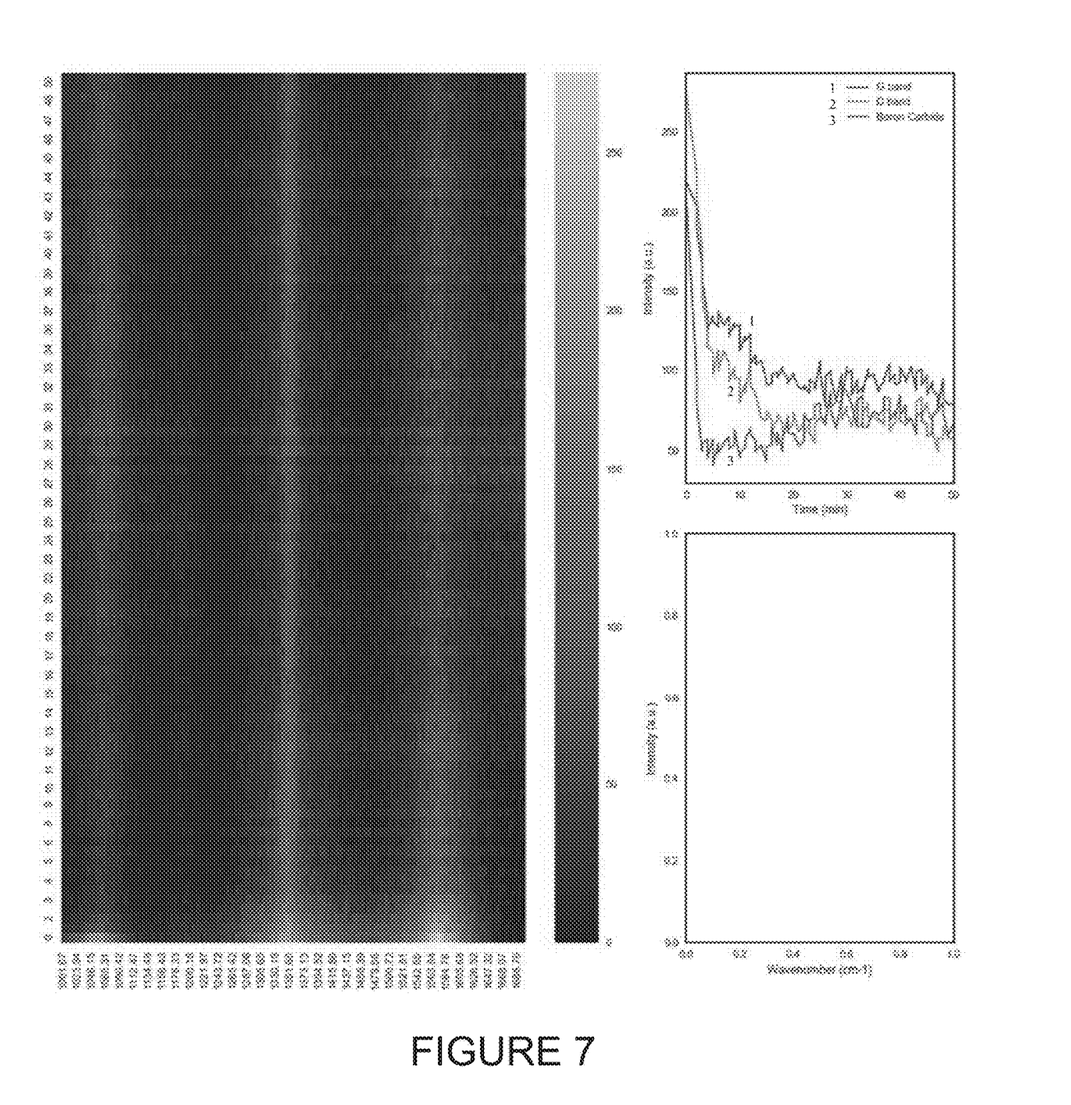
Figure 8:
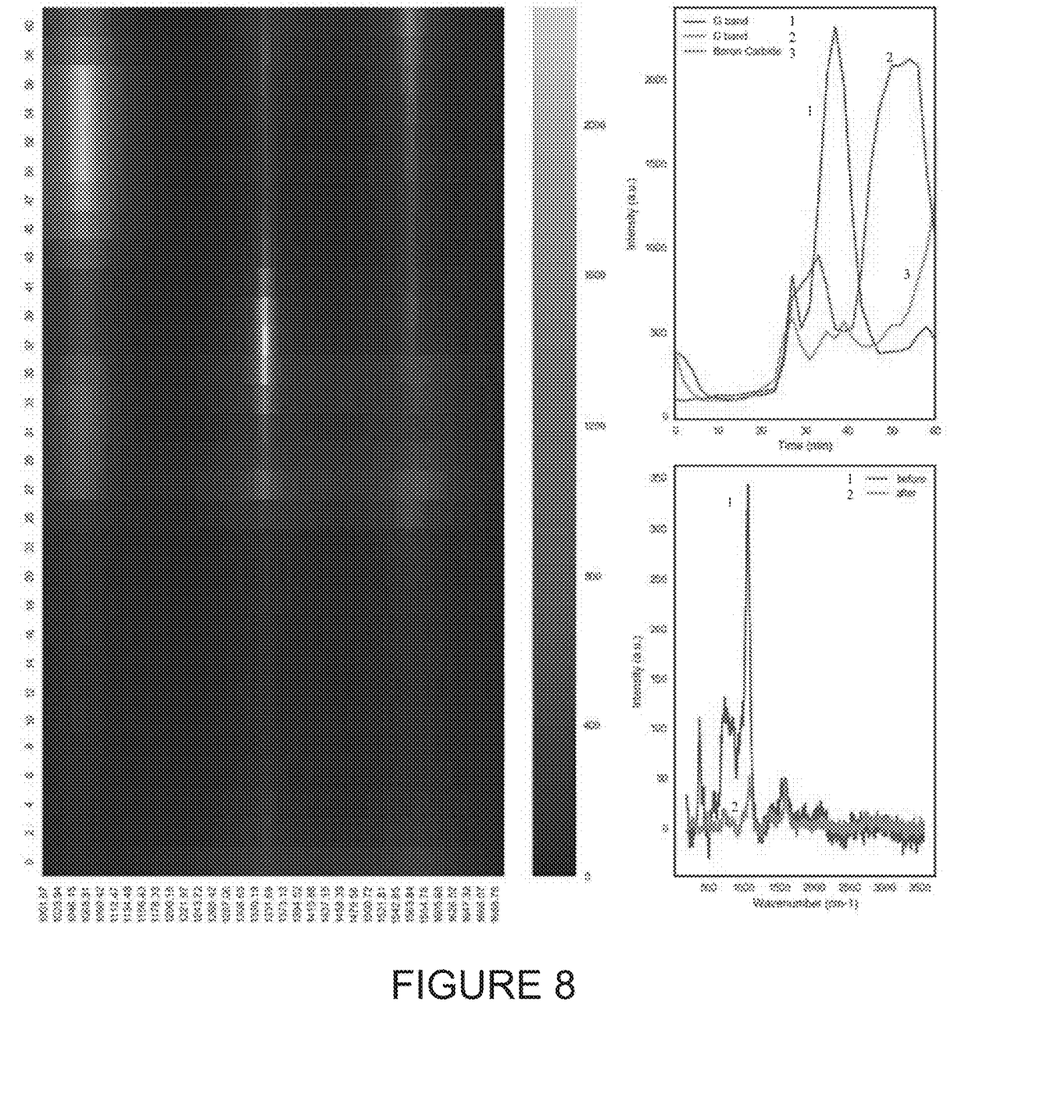

FIG. 2(b) is a graph of sequential µ-Raman spectra of another single spot with the relatively "thick" $B_4C$ powder of FIG. 1(a) under ultra-high purity Argon (1 ppm $H_2O$, $O_2$ per vendor) flow ~0.1 slm at various estimated laser intensities.

The graphite Raman spectrum consist of the intrinsic G-peak at ~1580 cm$^{-1}$, a large defect related D-peak at ~1350 cm$^{-1}$, and the related 2D and D+G overtones. In addition, there is another graphitic peak at ~1830 cm$^{-1}$ that will be addressed further below. This directly indicates that the $B_4C$ was graphitized due to the selective removal of boron during the µ-Raman measurement. Since $B_4C$ is typically an inert material with melting point >2000° C. [5], this was an unexpected result.

By performing the measurements at significantly lower laser intensity, the correct un-graphitized spectrum of $B_4C$ is recovered (FIGS. 2(a) and (b)). As the laser power is increased, the irreversible graphitization is observed, which shows that the graphitization is due to sample heating.

In particular, in FIG. 2(a), the sequential µ-Raman spectra of a single spot with "thick" $B_4C$ powder in ambient air environment were conducted at respective estimated laser intensities: (i) 0.6 kW/cm$^2$ (300K) (ii) 6 kW/cm$^2$ (300K) (iii)

60 kW/cm² (600-680K) (iv) 300 kW/cm² (730-850K) (v) 600 kW/cm² (1150-1400K) (vi) 300 kW/cm² (730-850K) (vii) 60 kW/cm² (600-680K) (viii) 6 kW/cm² (300K).

In FIG. 2(b), the sequential µ-Raman spectra of another single spot with "thick" B₄C powder under ultra-high purity Argon (1 ppm H₂O, O₂ per vendor) flow ~0.1 slm were conducted at respective estimated laser intensities: (i) 0.6 kW/cm² (300K) (ii) 6 kW/cm² (670-760K) (iii) 30 kW/cm² (1200-1500K) (iv) 60 kW/cm² (1500-1800K) (v) 30 kW/cm² (1200-1500K) (vi) 6 kW/cm² (670-760K) (vii) 0.6 kW/cm² (300K).

With reference to the intensities for each of FIGS. 2(a) and 2(b), the temperatures in parenthesis were estimated to 2 s.f. from the red-shift of the graphitic G-peak, 0.024-0.03 cm-1/K [19,20] referenced to room temperature, 300K value of G-1600 cm-1 (300K) at 0.6-6 kW/cm² at the end of the runs for both ambients. While the temperature is not explicitly calculated before the emergence of a strong G-peak, it is a reasonable estimate that for the same laser power that the temperatures are comparable, since both graphite, and B₄C are black powders that absorb strongly. The highest temperature spectrum in each plot of respective FIGS. 2(a) and 2(b) is shown as a thick line.

The black color of the B₄C implies that the powder acts as a black body, absorbing high intensities of laser light, locally heating up, when a suitable heat sink is not employed. From the position of the µ-Raman G-peak, the local temperature of the sample can be inferred [19,20]. As the sample heats up, the graphite lattice expands, leading to a redshift of the Raman peak. For the presently disclosed samples, the G-peak shifts from the room temperature value of ~1595 cm⁻¹ to 1560 cm⁻¹ at the highest laser power under UHP argon, a substantial shift of 35 cm⁻¹. Using the 0.024-0.03 cm⁻¹/K shift for the G-peak measured for defective graphite [19, 20], one may infer that temperatures >1400K are reached at the highest laser intensities (FIGS. 2(a) and 2(b)), with an observed graphitization threshold around 600K under both air (FIG. 2(a)) and UHP argon (FIG. 2(b)).

At the highest laser intensities under UHP argon (FIG. 2(b)), the µ-Raman signature of the B₄C disappears completely, showing that the graphite thickness is >50 monolayers [22], or ~17 nm due to the complete absorption of the 473 nm laser. Under air (FIG. 2(a)), the B₄C signature is still seen, indicating a much thinner layer.

The oxidation of B₄C has been observed at moderate temperatures ~500° C., for powders in the 1-3 µm range [16]. In the presence of water vapor, an unavoidable constituent of ambient air, as well as in ultra-high purity (UHP) Ar, oxidation of B₄C to B₂O₃ occurs at temperatures as low as 250 C [17].

B₄C+6H₂O→2B₂O₃(l)+C+6H₂ and/or     (Equation 1a)

B₄C+8H₂O→2B₂O₃(l)+CO₂+8H₂     (Equation 1b)

For laser illumination at high intensity, graphitization indicates that the reaction in Equation (1a) dominates, although Equation (1b) cannot be excluded. Litz et al. [17] further showed that the B₂O₃ on the surface can be removed faster than the B₂O₃ formation by the following reaction, also due to the presence of water vapor.

B₂O₃(l)+H₂O→2HBO₂(g)ORH₃BO₃(g)     (Equation 2)

There is no obvious Raman signature of B₂O₃ in presently conducted measurements, contrary to what was observed after annealing of hot-pressed B₄C in air at 800° C. by Erdemir et al. [18], indicating that B₂O₃ has evaporated due to the reaction in equation (2) for samples per the present disclosure. It is noted that the observation of graphite in the as-received samples by Erdemir et al. [18] may be due to in-situ graphitization as seen here, where their 25 mW 632 nm laser was focused to a 2-3 µm spot size, leading to a measurement geometry similar to presently disclosed "thick" samples. In fact, follow on measurements on similar samples [27] showed the disappearance of B₂O₃ and the emergence of graphitic Raman signatures, which may have occurred due to graphitization during the Raman measurements, as in the currently disclosed subject matter.

µ-Raman measurements performed under unfiltered UHP argon (FIG. 2(b)) also showed graphitization at similar laser powers, although the D-peak began to emerge at slightly lower laser intensity ~6 kW/cm² (but similar temperature) compared to in air (FIG. 2(a)). This may be attributed to unavoidable 1 ppm O₂ and H₂O impurities present in as received UHP argon. This suggests that the removal of carbon from B₄C by CO₂ formation reaction (Equation 1b) is suppressed under UHP argon compared to under air due to the lower vapor pressure of H₂O, although the graphitization in (Equation 1a) still proceeds. This highlights how readily the reactions in Equations (1) and (2) occur. Oxidation at such low partial pressures of O₂ is often observed in metals (e.g. [21]), especially with the assistance of low partial pressures of H₂O <1 ppm. It is also noted that the temperatures estimated from µ-Raman G-peak redshift under UHP argon are higher than under air, possibly due to the lack of heat removal by CO₂ generated in reaction (Equation 1b).

From the ratio of the intensities (i.e. area) of the D and G peaks, i.e. $I_D/I_G$, the average graphitic grain size. L, is estimated using the well-known [14,15,22]

$$L(nm) = (2.4 \times 10^{-10})\lambda_{laser}^4(nm)\left(\frac{I_D}{I_G}\right)^{-1} \quad \text{(Equation 3)}$$

where $\lambda_{laser}$ is the Raman excitation wavelength. For the presently disclosed laser graphitized samples, $I_D/I_G$ was ~0.8-1, indicating L~12 nm, close to the dimensions of the amorphization bands ~1-5 nm in impact testing of B₄C. Given that in impact-tested B₄C, very small shards may form, of high surface area, it is possible that these may graphitize during µ-Raman mapping of the damage zone, causing ambiguity in the interpretation of amorphization in B₄C-composites. It is presently suggested that single-crystals [6], and hot pressed samples [18] may be less susceptible to this graphitization owing to the high thermal conductivity of single-crystal B₄C as opposed to micro/nano-crystalline powders that have voids and inter-granular boundaries that suppress thermal conduction under laser illumination. The analogous result is in FIG. 1(c), where the µ-Raman measurements on "thin" B₄C immobilized on a thermally conductive ceramic plate prevented graphitization even at laser powers of ~60 kW/cm².

The graphitic Raman peak at ~1825 cm⁻¹ seen in FIG. 2(b), line (iii) (under UHP argon) is always observed in indentation induced amorphization studies of single crystal B₄C [5,6,23], and had previously been considered unknown. However, a similar feature is seen under air at ~1840 cm⁻¹ in FIG. 2(a) before the onset of graphitization, as well as in the "thin" measurement in FIG. 1(c), indicating that it could be an overtone combination of the <400 cm⁻¹ B₄C peak and the ~1520 cm⁻¹ B₄C peak. This peak shifts to ~1830 cm⁻¹ after graphitization (FIG. 2(a), line (iii)), although this may be due to heating effects. Features in this range have been observed in graphitic structures [24,25,26], particularly in non-planar geometries [26]. From the literature, this peak is likely either a combination of in-plane transverse acoustic/longitudinal optical modes (iTALO) [25], or a combination of a low frequency radial/defect related 1620 $cm^{-1}$ modes [26]. Based on the current data, however the exact mode assignment and origin of the 1820 $cm^{-1}$ feature cannot be unambiguously concluded.

Presently disclosed results show that ambiguities in interpretation of μ-Raman maps for amorphization studies [5,6,23] may be resolved by performing the measurements at low laser intensities to keep the temperature well below 250° C., under extremely high purity dry inert ambients, such as gettered argon, or by immobilizing samples on high thermal conductivity substrates. This result, based on the detailed study of oxidation kinetics [16,17], also shows that the processing of $B_4C$ composites such as sintering, consolidation etc., should also be performed in dry inert ambients, to prevent the formation of $B_2O_3$, readily removed in air, slippery graphite (this disclosure), and boric acid [18], potentially weakening the structure of the composite. While this water-vapor induced graphitization is a non-ideality that complicates characterization and processing of $B_4C$, it may be exploited to thermally produce graphitic layers on semiconducting $B_4C$ single-crystal structures for electronics applications [4], as has been done on SiC for example [22,28].

FIGS. 3 through 8 illustrate respectively various corresponding scans and graphs of wavenumber and time results relative to exposure intensities for various samples, including G band and D band information for various Boron Carbide $B_4C$ samples.

In summary, it was observed laser-induced graphitization at high laser intensities of 1-3 μm $B_4C$ powder at ambient conditions. This was attributed to water-vapor induced oxidation of the $B_4C$, and subsequent oxide removal also aided by water vapor. These presently disclosed results demonstrate that the characterization of amorphization of $B_4C$ by Raman mapping, and processing of $B_4C$ composites for impact-testing should be performed in dry, inert ambients.

While the presently disclosed subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the presently disclosed subject matter is by way of example rather than by way of limitation, and the subject disclosure does not preclude inclusion of such modifications, variations and/or additions to the presently disclosed subject matter as would be readily apparent to one of ordinary skill in the art.

Table 1 of Bracketed References

1. Emin, David. "Unusual properties of icosahedral boron-rich solids." *Journal of Solid State Chemistry* 179, no. 9 (2006): 2791-2798.
2. Xie, Kelvin Y., Qi An, Takanori Sato, Andrew J. Breen, Simon P. Ringer, William A. Goddard, Julie M. Cairney, and Kevin J. Hemker. "Breaking the icosahedra in boron carbide." *Proceedings of the National Academy of Sciences* 113, no. 43 (2016): 12012-12016.
3. Emin, David, and T. L. Aselage. "A proposed boron-carbide-based solid-state neutron detector." *Journal of applied physics97*, no. 1 (2005): 013529.
4. Caruso, A. N., Peter A. Dowben, S. Balkir, Nathan Schemm, Kevin Osberg, R. W. Fairchild, Oscar Barrios Flores et al. "The all boron carbide diode neutron detector: Comparison with theory." *Materials Science and Engineering: B* 135, no. 2 (2006): 129-133.
5. Domnich, Vladislav, Sara Reynaud, Richard A. Haber, and Manish Chhowalla. "Boron carbide: structure, properties, and stability under stress." *Journal of the American Ceramic Society* 94, no. 11 (2011): 3605-3628.
6. Yan, X. Q., W. J. Li, T. Goto, and M. W. Chen. "Raman spectroscopy of pressure-induced amorphous boron carbide." *Applied physics letters* 88, no. 13 (2006): 131905.
7. Vargas-Gonzalez, Lionel, Robert F. Speyer, and James Campbell. "Flexural strength, fracture toughness, and hardness of silicon carbide and boron carbide armor ceramics." *International Journal of Applied Ceramic Technology* 7, no. 5 (2010): 643-651.
8. Kunka, Cody, Amnaya Awasthi, and Ghatu Subhash. "Evaluating boron-carbide constituents with simulated Raman spectra." *Scripta Materialia* 138 (2017): 32-34.
9. Balakrishnarajan, Musiri M., Pattath D. Pancharatna, and Roald Hoffmann. "Structure and bonding in boron carbide: The invincibility of imperfections." *New Journal of Chemistry* 31, no. 4 (2007): 473-485.
10. Tallant, D. R., T. L. Aselage, A. N. Campbell, and D. Emin. "Boron carbide structure by Raman spectroscopy." *Physical review B* 40, no. 8 (1989): 5649.
11. Aselage, Terry L., and Ralph G. Tissot. "Lattice constants of boron carbides." *Journal of the American Ceramic Society* 75, no. 8 (1992): 2207-2212.
12. Schmechel, R., H. Werheit, T. U. Kampen, and W. Monch. "Photoluminescence of boron carbide." *Journal of Solid State Chemistry* 177, no. 2 (2004): 566-568.
13. Lunca-Popa, Petru, Jennifer I. Brand, Snjezana Balaz, Luis G. Rosa, Neil M. Boag, Mengjun Bai, Brian W. Robertson, and Peter A. Dowben. "Evidence for multiple polytypes of semiconducting boron carbide (C2B10) from electronic structure." *Journal of Physics D: Applied Physics* 38, no. 8 (2005): 1248.
14. Ferrari, Andrea C., and Jf Robertson. "Interpretation of Raman spectra of disordered and amorphous carbon." *Physical review B* 61, no. 20 (2000): 14095.
15. Pimenta, M. A., G. Dresselhaus, Mildred S. Dresselhaus, L. G. Cancado, Ado Jorio, and R. Saito. "Studying disorder in graphite-based systems by Raman spectroscopy." *Physical chemistry chemical physics* 9, no. 11 (2007): 1276-1290.
16. Li, Y. Q., and T. Qiu. "Oxidation behaviour of boron carbide powder." *Materials Science and Engineering: A* 444, no. 1-2 (2007): 184-191.
17. Litz, Lawrence M., and R. A. Mercuri. "Oxidation of Boron Carbide by Air, Water, and Air-Water Mixtures at Elevated Temperatures." *Journal of The Electrochemical Society* 110, no. 8 (1963): 921-925.
18. Erdemir, A., C. Bindal, C. Zuiker, and E. Savrun. "Tribology of naturally occurring boric acid films on boron carbide." *Surface and Coatings Technology* 86 (1996): 507-510.

| Table 1 of Bracketed References |
| --- |
| 19. Kagi, Hiroyuki, Ikari Tsuchida, Masao Wakatsuki, Kazuya Takahashi, Nao Kamimura, Keisuke Iuchi, and Hideki Wada. "Proper understanding of down-shifted Raman spectra of natural graphite: Direct estimation of laser-induced rise in sample temperature." *Geochimica et Cosmochimica Acta* 58, no. 16 (1994): 3527-3530. |
| 20. Everall, N. J., J. Lumsdon, and D. J. Christopher. "The effect of laser-induced heating upon the vibrational Raman spectra of graphites and carbon fibres." *Carbon* 29, no. 2 (1991): 133-137. |
| 21. Sakai, Hitoshi, Toshihide Tsuji, and Keiji Naito. "Effect of oxygen partial pressure on oxidation of iron at 573 K." *Journal of Nuclear Science and Technology* 21, no. 11 (1984): 844-852. |
| 22. Daas, B. K., Sabih U. Omar, S. Shetu, Kevin M. Daniels, S. Ma, T. S. Sudarshan, and M. V. S. Chandrashekhar. "Comparison of epitaxial graphene growth on polar and nonpolar 6H-SiC faces: On the growth of multilayer films." *Crystal Growth & Design* 12, no. 7 (2012): 3379-3387. |
| 23. Ghosh, Dipankar, Ghatu Subhash, James Q. Zheng, and Virginia Halls. "Influence of stress state and strain rate on structural amorphization in boron carbide." *Journal of applied physics* 111, no. 6 (2012): 063523. |
| 24. Cong, Chunxiao, Ting Yu, Riichiro Saito, Gene F. Dresselhaus, and Mildred S. Dresselhaus. "Second-order overtone and combination Raman modes of graphene layers in the range of 1690-2150 cm−1." *ACS nano* 5, no. 3 (2011): 1600-1605. |
| 25. Rao, Rahul, Ramakrishna Podila, Ryuichi Tsuchikawa, Jyoti Katoch, Derek Tishler, Apparao M. Rao, and Masa Ishigami. "Effects of layer stacking on the combination Raman modes in graphene." *ACS nano* 5, no. 3 (2011): 1594-1599. |
| 26. Tan, PingHeng, Svetlana Dimovski, and Yury Gogotsi. "Raman scattering of non-planar graphite: arched edges, polyhedral crystals, whiskers and cones." *Philosophical Transactions of the Royal Society of London A: Mathematical, Physical and Engineering Sciences* 362, no. 1824 (2004): 2289-2310. |
| 27. Dvorak, S. D., K. J. Wahl, and I. L. Singer. "Friction behavior of boric acid and annealed boron carbide coatings studied by in situ Raman tribometry." *Tribology transactions* 45, no. 3 (2002): 354-362. |
| 28. Chava, Venkata SN, Bobby G. Barker Jr, Anusha Baiachandran, Asif Khan, G. Simin, Andrew B. Greytak, and M. V. S. Chandrashekhar. "High detectivity visible-blind SiF4 grown epitaxial graphene/SC Schottky contact bipolar phototransistor." *Applied Physics Letters* 111, no. 24 (2017): 243504. |

What is claimed is:

1. A method of producing graphene, comprising:
providing Boron Carbide ($B_4C$) powder; and
exposing the powder in the presence of a gas to laser illumination with laser intensity in a range of 0.6 $kW/cm^2$ to 600 $kW/cm^2$, whereby localized formation of graphene on the surface of Boron Carbide is obtained.

2. The method as in claim 1, wherein said powder comprises single crystal $B_4C$, and exposing said powder comprises laser-writing graphitic contacts on said crystal for nanoelectronics.

3. The method as in claim 1, further including relatively increasing the temperature of said laser illumination for the formation of diamond like structures beyond the graphene formation.

4. The method as in claim 1, wherein said gas includes water vapor which interacts with the laser illuminated surface of Boron Carbide and leaves behind excess carbon.

5. The method as in claim 4, further including leaving behind graphitic material with size on a micrometer scale, for use in electronic applications.

6. The method as in claim 1, wherein exposing the powder to laser illumination comprises tuning one or more parameters of a laser source, where the one or more parameters of the laser source are selected from the group consisting of laser wavelength, laser power, laser energy density, laser resulting temperature operation, and combinations thereof.

7. The method as in claim 6, wherein the laser resulting temperature operation is controlled in a range of 250° K to 1800° K.

8. The method as in claim 6, wherein a wavelength of the laser source is tuned to match an absorbance band of the Boron Carbide powder.

9. The method as in claim 1, further comprising a step of incorporating the graphene into an electronic device.

10. The method as in claim 1, wherein the gas comprises one of air or a mixture of gases.

11. A method for the graphitization of Boron Carbide powder, comprising the steps of providing a specimen of Boron Carbide ($B_4C$) powder and performing Raman measurements on the specimen with a laser in a controlled environment.

12. The method as in claim 11, wherein said controlled environment comprises one of air and ultra-high purity Argon environments, wherein purity of said ultra-high purity Argon is Argon with no more than 1 ppm $H_2O$, $O_2$.

13. The method as in claim 12, wherein:
said controlled environment comprises air; and
said method further includes controlling the temperature and laser intensity of the laser so that temperature of said laser is controlled in a range of 300° K to 850° K, and intensity of said laser is controlled in a range of 0.6 $kW/cm^2$ to 600 $kW/cm^2$.

14. The method as in claim 12, wherein:
said controlled environment comprises an ultra-high purity Argon environment, wherein purity of said ultra-high purity Argon is Argon with no more than 1 ppm $H_2O$, $O_2$; and
said method further includes controlling the temperature and laser intensity of the laser so that temperature of said laser is controlled in a range of 300° K to 1800° K, and intensity of said laser is controlled in a range of 0.6 $kW/cm^2$ to 30 $kW/cm^2$.

15. The method as in claim 11, further including controlling the temperature and laser intensity of the laser.

16. The method as in claim 15, wherein temperature of said laser is controlled in a range of 250° K to 1800° K.

17. The method as in claim 15, wherein intensity of said laser is controlled in a range of 0.6 kW/cm² to 600 kW/cm².

18. The method as in claim 11, further including relatively increasing the temperature of the laser resulting in formation of a diamond coating on the Boron Carbide specimen.

19. The method as in claim 11, wherein said Boron Carbide specimen is an icosahedral $B_4C$ powder.

20. The method as in claim 19, wherein said Boron Carbide specimen has a density of about 1.8 g/cm³ with a specific surface area in a range of about 2-4 m²/g.

21. The method as in claim 19, wherein said Boron Carbide specimen is crystalline, stoichiometric $B_4C$ powder.

22. The method as in claim 21, wherein said crystalline, stoichiometric $B_4C$ powder has 1-3 μm crystal dimensions.

23. The method as in claim 11, wherein said laser is a 473 nm (2.62 eV) laser.

24. The method as in claim 11, wherein said laser is focused to a spot size of about 2-3 μm.

25. The method as in claim 11, wherein said graphitization provides about 12 nm grain size results.

26. The method as in claim 11, wherein said resulting graphitic material is less than about 17 nm thick.

27. The method as in claim 11, wherein:
said controlled environment comprises one of air and ultra-high purity Argon environments, wherein purity of said ultra-high purity Argon is Argon with no more than 1 ppm $H_2O$, $O_2$;
said Boron Carbide specimen is a crystalline icosahedral $B_4C$ powder having about 1-3 μm crystal dimensions; and
said method further includes controlling the temperature of said laser in a range of 250° K to 1800° K, controlling the intensity of said laser in a range of 0.6 kW/cm² to 600 kW/cm², and controlling the focus of said laser to a spot size of about 2-3 μm.

* * * * *